(12) United States Patent
Kløvning (10) Patent No.: US 12,097,835 B2
(45) Date of Patent: Sep. 24, 2024

(54) ASSEMBLY AND METHOD FOR A VEHICLE

(71) Applicant: Rollsense AS, Ulsteinvik (NO)

(72) Inventor: Bjarne Kløvning, Hareid (NO)

(73) Assignee: Rollsense AS, Ulsteinvik (NO)

( * ) Notice: Subject to any disclaimer, the term of this patent is extended or adjusted under 35 U.S.C. 154(b) by 57 days.

(21) Appl. No.: 16/766,255

(22) PCT Filed: Nov. 20, 2018

(86) PCT No.: PCT/NO2018/050284
§ 371 (c)(1),
(2) Date: May 21, 2020

(87) PCT Pub. No.: WO2019/103617
PCT Pub. Date: May 31, 2019

(65) Prior Publication Data
US 2021/0188230 A1    Jun. 24, 2021

(30) Foreign Application Priority Data
Nov. 21, 2017    (NO) .................................... 20171853

(51) Int. Cl.
*B60T 8/172*    (2006.01)
*B60T 8/171*    (2006.01)
*G01N 19/02*    (2006.01)

(52) U.S. Cl.
CPC ............ *B60T 8/1725* (2013.01); *B60T 8/171* (2013.01); *G01N 19/02* (2013.01)

(58) Field of Classification Search
CPC .... B60T 8/1725; B60T 8/171; B60T 2210/12; B60T 2210/13; B60T 8/172; G01N 19/02; G01M 17/02
See application file for complete search history.

(56) References Cited

U.S. PATENT DOCUMENTS

| 6,928,857 B1 | 8/2005 | Brown |
| 10,760,984 B2 * | 9/2020 | Eisenbeiss .............. G01M 1/04 |

(Continued)

FOREIGN PATENT DOCUMENTS

| CN | 105809306 | 7/2016 |
| EP | 0793207 A2 | 9/1997 |

(Continued)

OTHER PUBLICATIONS

International Preliminary Report on Patentability for PCT Application No. PCT/NO2018/050284, dated Mar. 20, 2020 in 14 pages.

(Continued)

*Primary Examiner* — Frederick M Brushaber
(74) *Attorney, Agent, or Firm* — Knobbe, Martens, Olson & Bear, LLP (57) ABSTRACT

Assembly comprising a vehicle (13, 13*a-c*) having a plurality of wheels (2), each of the wheels (2) arranged to support a weight of the vehicle (13) against an underlying surface (5); a sensor (10) operable to measure a force between one of the wheels (2) and a body of the vehicle (13, 13*a-c*); and a processor (15) configured to receive measurement data from the sensor (10). There is also provided a method for measuring conditions of a drive surface (5) and a method of operating vehicles (13, 13*a-d*) on a road (5).

13 Claims, 5 Drawing Sheets

(56) References Cited

U.S. PATENT DOCUMENTS

| | | | |
|---|---|---|---|
| 2003/0144786 A1* | 7/2003 | Hessmert | B60T 8/175 73/9 |
| 2005/0173179 A1* | 8/2005 | Amanuma | B60W 10/26 180/247 |
| 2006/0144121 A1* | 7/2006 | Neubert | G01N 19/02 73/7 |
| 2007/0029872 A1* | 2/2007 | Kurata | B60W 10/184 303/112 |
| 2008/0060411 A1* | 3/2008 | Schleif | G01N 19/02 73/9 |
| 2008/0115563 A1* | 5/2008 | Potts | G01N 19/02 73/9 |
| 2008/0243335 A1* | 10/2008 | Rao | B60T 8/1725 701/41 |
| 2009/0006007 A1* | 1/2009 | Greiner | G01M 17/02 702/44 |
| 2009/0160675 A1 | 6/2009 | Piccinini et al. | |
| 2009/0236157 A1* | 9/2009 | Akamatsu | B60K 17/046 180/55 |
| 2009/0276113 A1* | 11/2009 | Sugimoto | B60T 8/1725 701/31.4 |
| 2016/0016564 A1 | 1/2016 | Otake et al. | |
| 2021/0178846 A1* | 6/2021 | Coombs | B60G 17/0152 |

FOREIGN PATENT DOCUMENTS

| | | |
|---|---|---|
| EP | 3059129 A1 | 8/2016 |
| EP | 3206056 A1 | 8/2017 |
| JP | H4-331336 A | 11/1992 |
| JP | 2006-518461 A | 8/2006 |
| JP | 2009-251741 A | 10/2009 |
| JP | 2013-200171 A | 10/2013 |
| JP | 2016-75575 A | 5/2016 |
| WO | 200171315 A1 | 7/2001 |
| WO | WO2003019126 A1 * | 8/2002 |
| WO | 2019103617 A1 | 5/2019 |

OTHER PUBLICATIONS

Norwegian Search Report for Application No. 20171853, dated Jun. 6, 2018 in 2 pages.

Office Action issued for corresponding Japanese Patent Application dated Jul. 13, 2022 in 9 pages including English translation.

Office Action issued in corresponding Chinese patent application No. 201880075178.9, dated Jun. 19, 2024.

* cited by examiner

ASSEMBLY AND METHOD FOR A VEHICLE

CROSS-REFERENCE TO RELATED APPLICATIONS

This application is the U.S. National Phase under 35. U.S.C. § 371 of International Application PCT/NO2018/050284, filed Nov. 20, 2018, which claims priority to Norwegian Patent Application No. 20171853, filed Nov. 21, 2017. The disclosures of the above-described applications are hereby incorporated by reference in their entirety.

FIELD OF THE INVENTION

The present invention relates to an assembly and a method for operating a vehicle or a plurality of vehicles.

BACKGROUND

In road traffic and in various other applications, such as at airports, it is both for safety and for operational efficiency useful to have knowledge of various environmental aspects relating to roads, runways, pavements, etc. For example, energy consumption, noise, air pollution, actual rolling resistance and other properties can be relevant. These and other factors may apply to all types of wheels of vehicles, which are moving on a roadway.

Documents which may be useful for understanding the background include U.S. Pat. Nos. 4,958,512, 4,098,111 and 6,923,038.

For example, rolling resistance that arises during driving and braking is a result of very complex mechanisms, which are influenced by many factors, for example the surface of the ground, the velocity of the vehicle, air temperature, the design of the tyres, the quality of the tyres and not least whether there is water, mud, snow or ice on the ground. Even with apparently similar conditions, the rolling resistance can vary significantly, for example it can be mentioned that water whipped with air has very different properties compared to water which is not mixed with air. This last condition is one that has traditionally not been aware of and taken it into account.

It is therefore desirable to provide new systems and techniques for measuring of rolling resistance or other parameters associated with vehicles and/or drive surfaces to a greater accuracy.

SUMMARY

In an embodiment, there is provided an assembly comprising a vehicle having a plurality of wheels, each of the wheels arranged to support a weight of the vehicle against an underlying surface; a sensor operable to measure a force between one of the wheels and a body of the vehicle; and a processor configured to receive measurement data from the sensor.

In an embodiment, there is provided a method for measuring conditions of a drive surface, the method comprising: driving a vehicle having an assembly according to any preceding claim on the surface; logging a series of force measurements from the sensor.

In an embodiment, there is provided a method of operating vehicles on a road, the method comprising: obtaining a road condition parameter from a sensor at a first vehicle; and transmitting the road condition parameter and a geographical location parameter, the geographical location parameter being representative of the location at which the road condition parameter was obtained, to a central computing system.

The appended dependent claims and the detailed description below outline further embodiments.

BRIEF DESCRIPTION OF THE DRAWINGS

The above and other characteristics will become clear from the following description of illustrative embodiments, given as non-restrictive examples, with reference to the attached drawings, in which.

DETAILED DESCRIPTION

Various parameters relating to vehicles or drive surfaces, such as roads, may be relevant for capturing, analysis and use with systems and methods as described herein.

In relation to measurement of rolling resistance, there may be large differences in the way that water affects the measuring devices. Water falling for instance as rain during sampling, is quite different from water lying still on the road. Likewise the quantity of water (the depth) is of great importance regarding rolling resistance. Use of the present invention makes it possible to eliminate a number of usually occurring uncertainty factors, in that values can be read off directly on a monitor without converting external data regarding the condition of the road, tyres, water density and so on.

Figure 1:
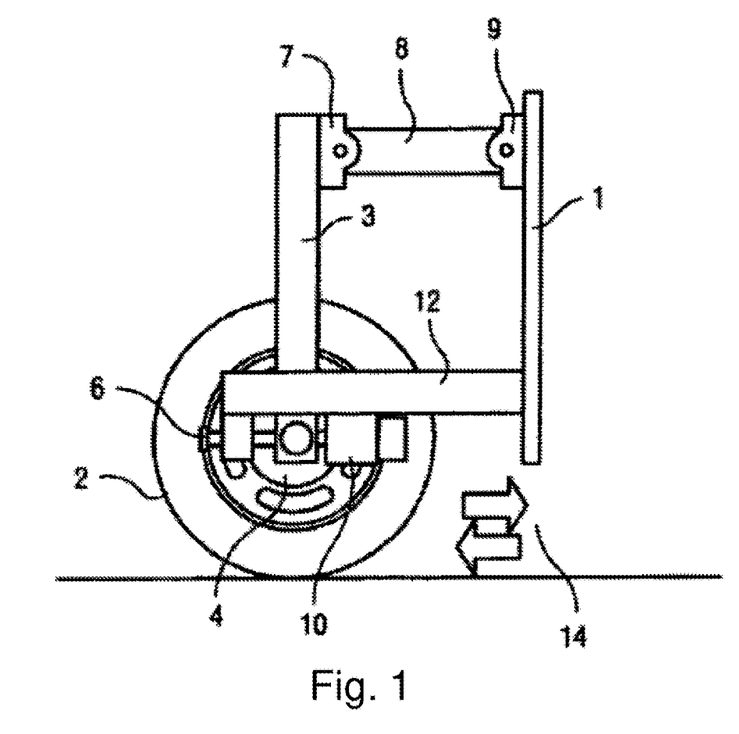
FIG. 1 shows the device according to the invention arranged on a rig carrying a wheel, seen from the side.
Figure 2:
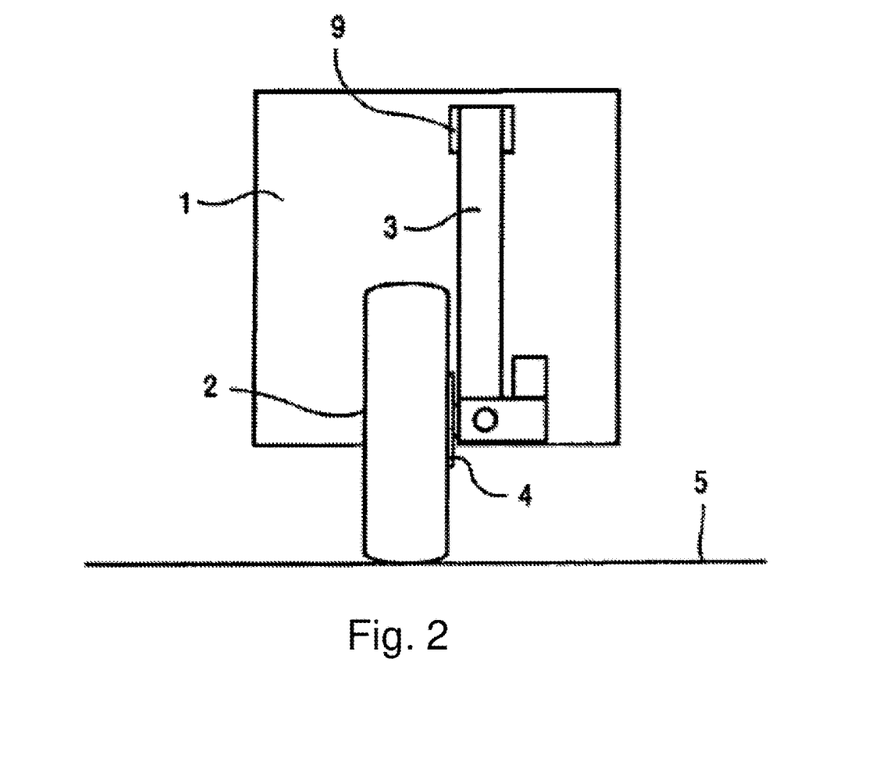
FIG. 2 shows the device of FIG. 1 seen from ahead.
Figure 3:
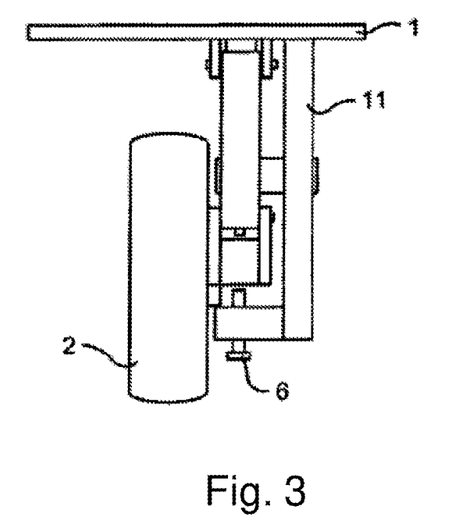
FIG. 3 shows the device of FIG. 1 seen from above.
Figure 4:
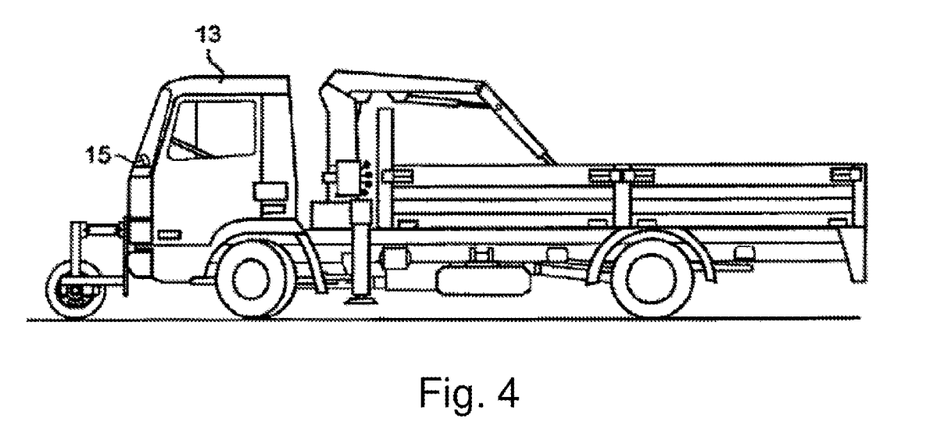
FIG. 4 shows the device of FIG. 1 mounted in front of a vehicle.

FIG. 1 shows a device according to an embodiment mounted in a rig, the rig carrying a wheel, as seen from the side. The rig can be attached to the front of a vehicle. FIG. 2 shows a front view of the same device, and FIG. 3 a top view. FIG. 4 shows the device arranged on a vehicle 13. The device comprises a bracket or fastening plate 1 on which the device is secured on one side, and on the other side the plate 1 is secured to the vehicle 13. As shown in FIG. 4, the device is located in front of the vehicle 13.

The device comprises at least one wheel 2 that preferably by means of its own weight impinges the ground 5. In the wheel 2 is a nave 4. The wheel 2 can freely rotate around the nave 4, without brakes.

The suspension of the wheel 2 comprises a vertical holder 3 that is supported in the upper edge and may pivot around this point 7 as a pendulum. The arm 8 is also movable around its supporting locality 9 that has its attachment in the plate 1 which is secured to the vehicle 13.

To avoid that the vertical holder is getting out of its precise position during driving, it is equipped with an adjusting screw 6 located on a pendant arm 11 which provides that it does not loosen. The vertical holder may to a certain degree move up and down, such that the wheel 2 is always in touch with the roadway with a downwards pressure. The downwards pressure may be provided by the weight of the wheel 2 and the holder 3. The wheel 2 may also be provided with a spring that keeps the wheel towards the roadway with a constant pressure.

When the vehicle 13 is moving forward, there will arise a force from the wheel 2 toward the vehicle 13, illustrated with an arrow 14. A measuring cell 10, which is installed on the permanent pendant girder 12 from the bracket 1 receives and measures this force.

Figure 5:
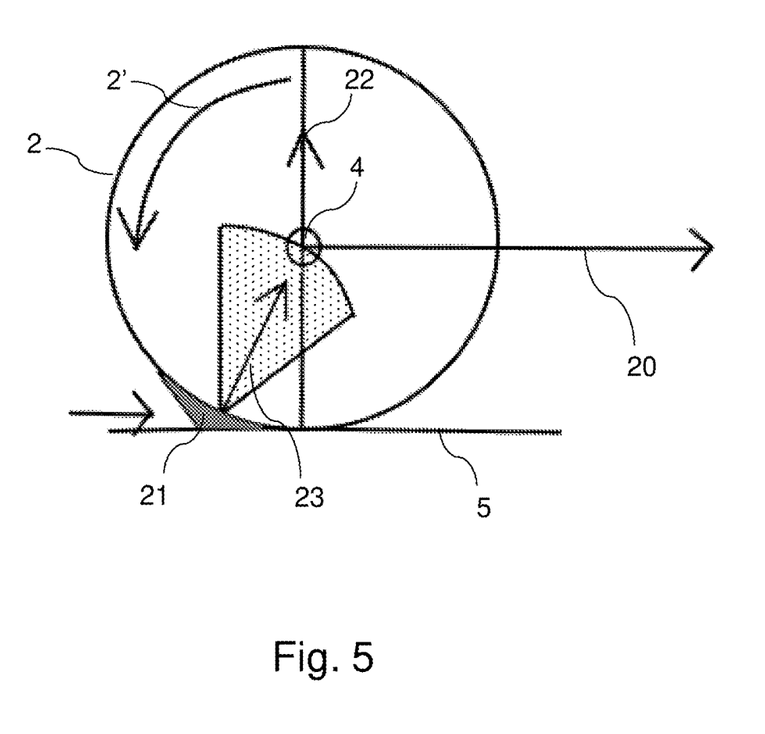
FIG. 5 illustrates rolling resistance.

FIG. 5 illustrates the rolling resistance of the wheel 2 moving on a surface 5. The wheel 2 rotates as indicated by the arrow 2'. A part of the rolling resistance is the deformation of the surface and the wheel. In addition, as the wheel 2 moves on the surface 5, an amount of liquid 21, such as water or mud, will be displaced by the wheel 2, thus creating a hydraulic force 23 in the direction of the nave 4. The resistance of the forward motion creates a force on the nave 4, the force having a horizontal force component Fx 20, a vertical force component Fy 22 and a perpendicular force component Fz, not shown. The horizontal force component Fx is as illustrated by arrow 20 acting backwards. The forces acting on the nave 4 can be measured by the load cell 10 (see FIG. 1).

From the sensor 10 there is a connecting line or a wireless connection to a processor 15 inside the driver's cab, which displays the force on a monitor display.

In one embodiment, the measured force can be stored on a computer system and/or transmitted to a remote location. The measured force may be transmitted in real time. The force can be calibrated in relation to a measured speed of the vehicle 13. The speed of the vehicle 13 can be measured by a tachometer associated with the wheel 2 and/or a tachometer within the vehicle 13.

The measurements can be performed by setting a fixed, substantially constant velocity of the vehicle 13, or by obtaining measurements at different speeds of the vehicle 13. Measuring at different speeds may provide improved knowledge of the road conditions, since certain aspects associated with the measured parameters may be highly non-linear in nature. Obtaining readings at different measurement points may thus provide improved accuracy.

To obtain the data, the vehicle 13 drives on the roadway, and it is possible to read on the display the rolling resistance, or the measured values for this can be logged locally or remotely. Optionally, other parameters can be measured, such as acceleration. Data relating to rolling resistance, noise emission, skid resistance, surface texture, other safety issues, energy consumption, or other aspects may then be displayed and/or stored.

The device can be located in front of the vehicle 13. This allows the device to measure the conditions of a surface that has not been disturbed by the vehicle 13, and avoids other influence of the vehicle 13 on the measurements.

The obtained data can be coordinated and converted to units that can be compared from time to time, or continuously. Measurements from different times may then be compared to identify, for example, a deterioration of the surface 5.

The wheel 2 and associated components may be secured to the bracket 1 with a quick release coupling, to ease the use of the device. Alternatively, the bracket 1 may be releasable from the vehicle 13 in the same way.

As described above, the wheel 2 is suspended in a link which may pivot to some degree in the vertical plane, in order to absorb minor unevenness on the roadway.

In one embodiment, the sensor 10 may be arranged on at least on of the regular wheels of the vehicle 13, each of the wheels 2 arranged to support a weight of the vehicle 13 against the underlying surface 5. Having the sensor 10 on any of the front wheels of the vehicle 13 allows the device to measure the conditions of a surface that has not been disturbed by the vehicle 13. The sensor 10 may then measure the horizontal force component Fx acting between the wheel 2 and the body of the vehicle 13, for example a force representative of the rolling resistance of the road or underlying surface 5 as the vehicle 13 drives; the vertical force component Fy acting between the wheel 2 and the body of the vehicle 13; a perpendicular force component Fz acting between the wheel 2 and the body of the vehicle 13; a combination of these; and/or forces acting in different directions.

The processor 15 can receive the measurements and store these, process them, transmit them further, etc.

Figure 6:
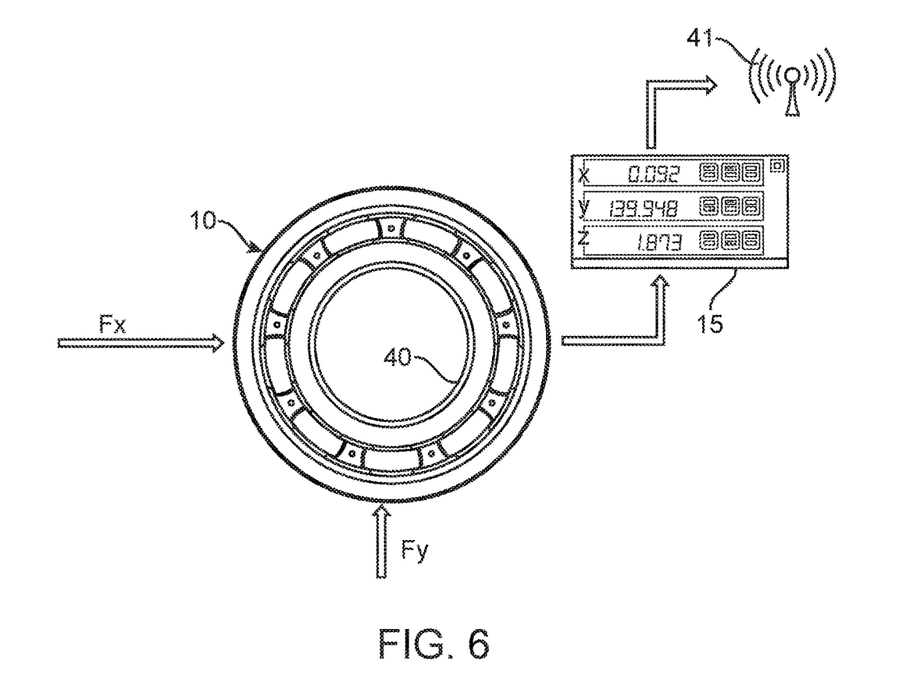
FIG. 6 illustrates components of an embodiment.

The sensor 10 may be a load cell configured to measure a force acting from the wheel 2 on the vehicle 13 in the vehicle's direction of travel, i.e. horizontally, in a vertical direction, or in other directions. FIG. 6 illustrates an example of a sensor 10 suitable for use with embodiments described herein. The sensor 10 in this embodiment is arranged around a bearing 40 which supports one of the wheels 2 of the vehicle 13. The sensor 10 measures a force Fx in the horizontal direction and a force Fy in the vertical direction acting between the wheel 2 and the body of the vehicle 13. The sensor 10 may, alternatively or in addition, measure other forces, i.e. such forces which act in different directions compared to the horizontal or vertical.

The sensor 10 may be a single sensor measuring a plurality of forces, direction and magnitude, working on the nave 4. The sensor 10 may be made up of a plurality of individual sensor units, each sensor unit measuring a force in one particular direction.

The readings from the sensor 10 may be sent to a display on the processor 15 for displaying to a driver or another operator in the vehicle 13, and/or it may be transmitted to a location external to the vehicle 13 via a data transmitter 41. The data transmitter 41 may, for example, be a wireless communication device such as a GSM device, a WLAN device, or a Dedicated short-range communications (DSRC) device. The wireless communication device could for example be an Intelligent Transport Systems (ITS) device.

In one embodiment, the processor 15 is operable to determine a condition where the vehicle is about to experience loss of traction and display a warning to the driver or another operator of the vehicle. In one example, the processor may determine that the vertical force component Fy, due to liquid on the surface 5, is about to exceed the weight of the wheel 2, a condition known as hydroplaning or aquaplaning.

In one embodiment, the processor 15 is operable to transmit the measurement data from the sensor 10 to a receiver 30 outside the vehicle 13. The receiver may be, for example, a central computing system 30 located at a remote location, such as a data centre, with which the processor 15 is connected via wireless data transfer. In this way, the measurement data may, for example, be transferred "to the cloud", for further processing or use by others. The transfer of the measurement data may be done in real time. This is illustrated schematically in FIGS. 7 and 8, with the arrows indicating transfer of data to and/or from a plurality of vehicles 13a-d driving on a road 5.

Figure 7:
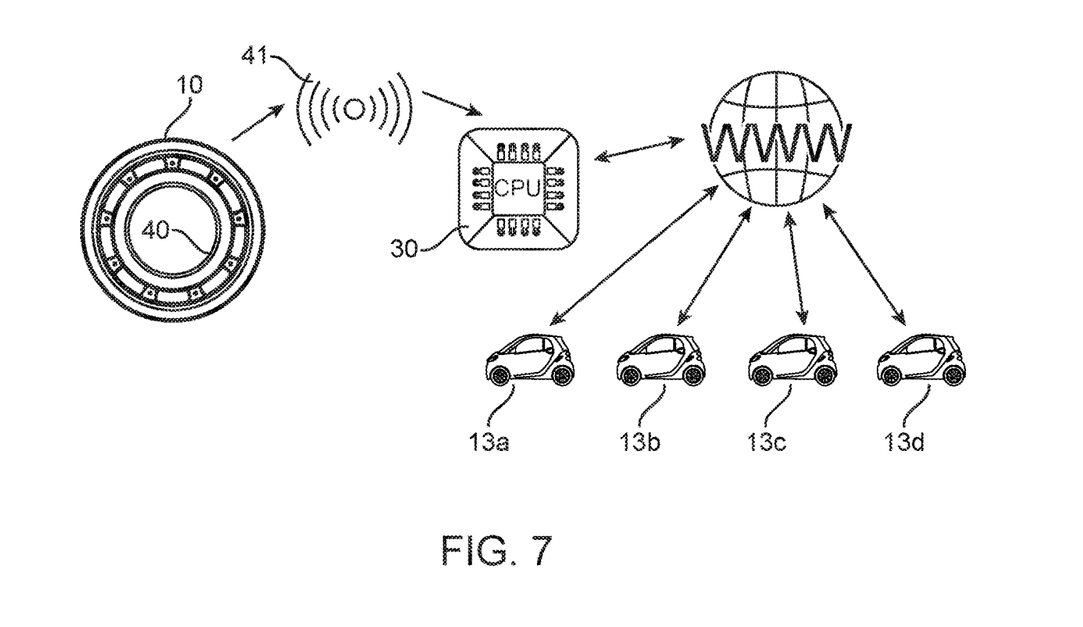
FIG. 7 illustrates components of an embodiment.
Figure 8:
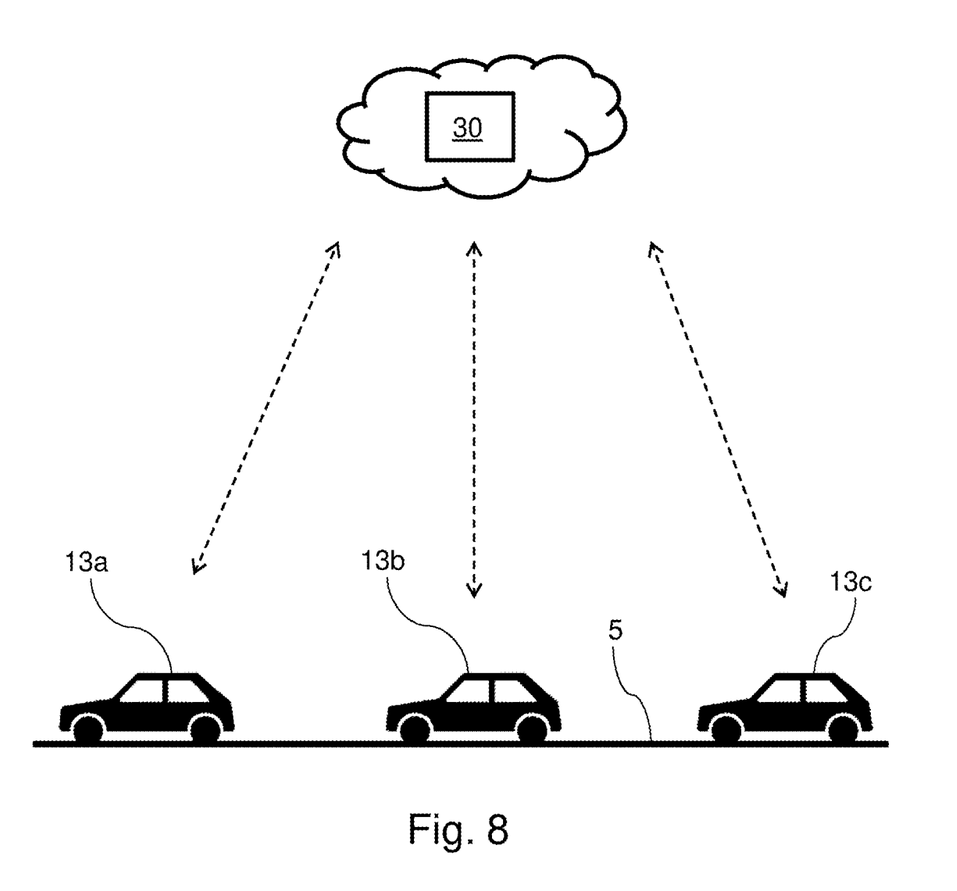
FIG. 8 illustrates a method according to an embodiment.

Optionally, a series of geographical coordinates, such as GPS readings, may be transmitted together with the measurement data, such that each geographical coordinate corresponds to a respective force measurement. In this way, a map of the road conditions (for example, rolling resistance or friction) across a length of road or surface 5 can be obtained. This map can be used by others to analyze road conditions, for operational planning (e.g. road maintenance), or to provide safety-related data to the vehicle 13 and/or other vehicles 13a-d.

In an embodiment, measurement data from several vehicles 13a-d can be transmitted to the central computing system 30. This may provide more complete information about road conditions, with higher granularity, and more accurate information, in that independent measurements is available and available for direct use or, for example, for trending/forecasting.

In an embodiment, a method according to the invention can be used to transmit data back from the central processing system 30 to one or more of the vehicles 13a-d. For example, a surface condition parameter can be calculated, the surface condition parameter being determined on the basis of several force measurements and being representative of the rolling resistance of the road or surface 5 at different locations. This may comprise, or be supplemented by, corresponding geographical location data. In this way, vehicles 13a-d may receive information on road conditions ahead, which may be relevant for safety or for energy consumption. For example, electric vehicles may in such a case provide more accurate predictions on the available driving range, by taking into account actual road conditions. Or, specific road location with increased safety risks may be identified and information relating to these may be provided to vehicles 13a-d approaching it. One example of this may be locations with wet roads with increased risk of aquaplaning. By providing information on this to the vehicle 13a-d and/or to the driver, the risk of accidents can be reduced.

Embodiments of the present invention may be particularly useful in cold climates, such as in regions with snow, ice and mud-covered roads. In such cases, vehicle energy use may vary significantly according to road conditions, and there are also increased requirements for road maintenance (e.g. snow clearing). Nevertheless, embodiments described herein can be useful in any location.

Road friction may, for example, be measured in the same way as described in U.S. Pat. No. 6,923,038 B2, by measuring the maximum horizontal force Fx obtained during driving.

In one embodiment, there is provided a method of operating vehicles 13a-d on a road 5, the method comprising obtaining a road condition parameter from a sensor 10 at one vehicle 13a-d; and transmitting the road condition parameter and a geographical location parameter to a central computing system 30. The geographical location parameter is representative of the location at which the road condition parameter was obtained. The central computing system 30 is thus provided with actual and current information on the road condition at that location.

The road condition may be a measured friction between the wheel 2 and the road 5, a measured rolling resistance of the wheel 2 on the road 5, an identified damage to the road 5, such as damage to the asphalt, or an indicator for a road maintenance requirement. The latter may be, for example, a level of snow or ice which requires clearing snow from the road 5 or gritting the road 5. This information may be provided to a central location where road management personnel monitor the state of the road 5 and may take action as necessary. By means of the method, a more accurate maintenance of the road 5 is achieved, with a shorter response time for personnel to take action when necessary, and/or avoiding for example unnecessary gritting.

Advantageously, one can use the method to obtain road condition parameters from a plurality of sensors 10 arranged at different vehicles 13a-d. This improves accuracy and granularity. In an ideal scenario, one might envisage a large number of vehicles, or even substantially all vehicles travelling on a particular road 5, to obtain road condition parameters and transmit these to the central computing system 30.

Having information on road conditions at a given location, the method may further comprise performing a road maintenance action at the location.

In one embodiment, the method comprises transmitting road condition data from the central computing system 30 to a second vehicle 13a-d, where the road condition data comprises information on a road condition on at least one location of the road 5. This can be, for example, a site with icy road surface which poses a safety risk. Information about this site from the central computing system 30 may then be transmitted to a vehicle 13a-d approaching the location, as a warning for the driver or for the vehicle drive system.

The sensor arrangement on the (or each) vehicle 13a-d may be any of those described above and illustrated in FIGS. 1-6. For example, the sensor 10 can be arranged between a wheel 2 of the vehicle 13a-d and a wheel suspension 3, 12, similar to that shown in FIG. 1, or between a bearing 40 and the body of the vehicle 13a-d as illustrated in FIG. 6. In another example, the sensor 10 is integrated in one of the regular components of the vehicle 13a-d. Alternatively, a different type of sensor may be used, such as a visual sensor, a camera, an acceleration sensor which registers the vehicle's dynamics, a wheel spin sensor which registers loss of traction or discrepancies between different wheels of the vehicle 13a-d, or other types of sensors.

According to embodiments described herein, recording rolling resistance data or other data in a reliable, easy and safe way is made possible. Other relevant data may be, for example, noise emission, skid resistance, surface texture, other safety issues, energy consumption, etc, according to given requirements. The data can be converted and displayed on a monitor for instance in the drivers cabin of a vehicle or transmitted to a remote location. In this way it is possible to read the correct values and they will give the actual parameters of the carriageway. This can then be used, for example, for planning of road maintenance. In some embodiments, the apparatus and method can be used to achieve improved safety.

The invention is not limited by the embodiments described above; reference should be had to the appended claims.

What is claimed is:

1. An assembly for measuring one or more forces acting on one of a plurality of wheels of a vehicle and for determining surface condition(s) of a road surface including at least rolling resistance, each of the plurality of wheels being arranged to support a weight of the vehicle against the underlying road surface, the assembly comprising:

a force sensor operable to measure a force between one of the plurality of wheels and a body of the vehicle as the vehicle is moving; and a processor configured to receive measurement data from the force sensor, wherein the force sensor is a single sensor that is arranged to measure the forces working on a nave of the one of the plurality of wheels and is configured to measure a force (Fx) acting from the one of the plurality of wheels on the vehicle in a substantially horizontal direction, a force (Fy) acting from the one of the plurality of wheels on the vehicle in a substantially vertical direction, and a force acting from the one of the plurality of wheels on the vehicle in any direction different from the horizontal and the vertical; and wherein the processor is configured to obtain a road condition parameter from the force sensor by logging a series of force measurements from the force sensor at a plurality of different vehicle speeds; logging the vehicle speeds; and calculating the road condition parameter as a function of at least the series of force measurements and the vehicle speed; and wherein the road condition parameter represents surface condition(s) of the road surface including at least a measured rolling resistance of the one of the plurality of wheels on the road surface.

2. The assembly according to claim 1, wherein the processor is configured to display the measurement data to a driver of the vehicle.

3. The assembly according to claim 1, wherein the processor comprises a data transmitter operable to transmit the measurement data from the force sensor to a receiver outside the vehicle.

4. A method for measuring conditions of a drive surface including at least the rolling resistance of the drive surface, the method comprising:
   providing an assembly for measuring one or more forces acting on one of a plurality wheels of a vehicle, each of the plurality of wheels being arranged to support a weight of the vehicle against the underlying drive surface,
   wherein said assembly comprises:
      a force sensor configured to measure a force between said one of the plurality of wheels and a body of the vehicle as the vehicle is moving; and
      a processor configured to receive measurement data from the force sensor,
      wherein the force sensor is a single sensor that is arranged to measure the forces working on a nave of the wheel and is operable to measure a force (Fx) acting from the one of the plurality of wheels on the vehicle in a substantially horizontal direction, a force (Fy) acting from the one of the plurality of wheels on the vehicle in a substantially vertical direction, and a force acting from the one of the plurality of wheels on the vehicle in any direction different from the horizontal and the vertical;
   driving a vehicle having the assembly on the drive surface; and
   logging a series of force measurements from the force sensor at a plurality of different vehicle speeds; logging the vehicle speeds; and calculating a road condition parameter, the road condition parameter being a function of at least the series of force measurements and the vehicle speed, wherein the road condition parameter represents surface condition(s) of the drive surface including at least a measured rolling resistance of the one of the plurality of wheels on the drive surface.

5. The method according to claim 4, comprising:
   transmitting the series of force measurements to a receiver outside the vehicle.

6. The method according to claim 5, further comprising:
   transmitting a series of geographical coordinates, each geographical coordinate in the series of geographical coordinates corresponding to a respective force measurement in the series of force measurements.

7. The method according to claim 5, comprising:
   transmitting the series of force measurements from a plurality of vehicles to the receiver.

8. The method according to claim 7, comprising:
   transmitting the surface condition parameter to a plurality of vehicles from the receiver.

9. A method of operating vehicles on a road, using an assembly for measuring one or more forces acting on one of a plurality wheels of each vehicle, each of the plurality of wheels being arranged to support a weight of a corresponding vehicle against an underlying road surface,
   wherein said assembly comprises:
      a force sensor that is arranged to measure the forces working on a nave of the wheel and is operable to measure a force between said one of the plurality of wheels and a body of the corresponding vehicle as the vehicle is moving; and
      a processor configured to receive measurement data from the force sensor,
      wherein the force sensor is a single sensor configured to measure a force (Fx) acting from the one of the plurality of wheels on the corresponding vehicle in a substantially horizontal direction, a force (Fy) acting from the one of the plurality of wheels on the corresponding vehicle in a substantially vertical direction, and a force acting from the one of the plurality of wheels on the corresponding vehicle in any direction different from the horizontal and the corresponding vertical;
   the method comprising:
   obtaining a road condition parameter from the force sensor at a first vehicle of the vehicles on the road by logging a series of force measurements from the force sensor at a plurality of different vehicle speeds; logging the vehicle speeds; and calculating the road condition parameter as a function of at least the series of force measurements and the vehicle speed; and
   transmitting the road condition parameter and a geographical location parameter, the geographical location parameter being representative of the location at which the road condition parameter was obtained, to a central computing system;
   wherein the road condition parameter represents:
   a measured rolling resistance of the one of the plurality of wheels on the road surface.

10. The method according to claim 9, comprising
    obtaining road condition parameters from each of force sensors arranged at the vehicles.

11. The method according to claim 9, comprising performing a road maintenance action at the location.

12. The method according to claim 9, comprising transmitting road condition data from the central computing system to a second vehicle of the vehicles on the road, the road condition data comprising information on a road condition on at least one location.

13. The method according to claim 9, wherein each force sensor is arranged between the wheel of each vehicle and the wheel suspension, and the method further comprises operating each force sensor to measure:
    a rolling resistance of the wheel on the road; and/or
    a friction between the wheel and the road; and/or
    a force acting from the wheel on the vehicle in the vehicle's direction of travel, i.e. horizontally, in a vertical direction, or in any other directions.

\* \* \* \* \*